(12) United States Patent
Bean et al.

(10) Patent No.: US 6,677,999 B2
(45) Date of Patent: Jan. 13, 2004

(54) NON-POLARIZING LCD SHUTTER

(75) Inventors: Heather Noel Bean, Fort Collins, CO (US); Mark Nelson Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 09/901,222

(22) Filed: Jul. 9, 2001

(65) Prior Publication Data

US 2003/0007086 A1 Jan. 9, 2003

(51) Int. Cl.⁷ .................. H04N 5/235; H04N 5/225; G02F 1/00; G02F 1/03; G03B 9/08; G02B 27/28
(52) U.S. Cl. .................. 348/362; 348/335; 348/343; 348/344; 396/457; 396/471; 359/245; 359/246; 359/494
(58) Field of Search .................. 348/335, 337, 348/340, 343–344, 362, 363; 396/457, 471; 359/245, 246, 494

(56) References Cited

U.S. PATENT DOCUMENTS

| 4,875,100 A | 10/1989 | Yonemoto et al. ..... 358/213.19 |
| 4,917,452 A | 4/1990 | Liebowitz ................ 350/96.15 |
| 4,935,820 A | 6/1990 | Patel et al. ................ 358/302 |
| 5,029,989 A | 7/1991 | Phillips ...................... 350/355 |
| 5,107,351 A * | 4/1992 | Leib et al. .................. 359/256 |
| 5,140,428 A | 8/1992 | Park ........................... 358/244 |
| 5,337,106 A | 8/1994 | Jutamulia et al. ........... 354/152 |
| 5,808,588 A | 9/1998 | Lin ................................. 345/6 |
| 5,822,021 A * | 10/1998 | Johnson et al. ................ 349/18 |
| 5,907,434 A * | 5/1999 | Sekine et al. ............... 348/335 |
| RE37,752 E * | 6/2002 | Wolff ..................... 348/207.99 |
| 2002/0034004 A1 * | 3/2002 | Khoshnevis et al. ........ 359/407 |
| 2002/0051070 A1 * | 5/2002 | Ortyn et al. ................ 348/335 |

\* cited by examiner

*Primary Examiner*—Andrew Christensen
*Assistant Examiner*—Nhan T Tran

(57) ABSTRACT

An electronic shutter apparatus and light shuttering method for a still image capturing device are provided according to the invention. In one embodiment, the apparatus includes a beam splitter positioned in an incoming light beam path and splitting the incoming light beam into a first light beam and a second light beam. The apparatus further includes first and second polarizing shutters respectively positioned in paths of the first and second light beams and capable of being electrically activated to transmit light and to respectively form first and second polarized light beams. A polarization orientation of light from the second polarizing shutter is in non-alignment with a polarization orientation of light from the first polarizing shutter. The apparatus further includes a beam combiner receiving and combining the first and second polarized light beams to form a substantially non-polarized resultant light beam. The resultant light beam is focused onto an image sensor.

20 Claims, 3 Drawing Sheets

NON-POLARIZING LCD SHUTTER

FIELD OF THE INVENTION

The present invention relates generally to an electronic shutter, and more particularly to a non-polarizing electronic shutter for a still image capturing device.

BACKGROUND OF THE INVENTION

Still image capturing devices are used to visually memorialize scenes, events, or items. Still image capturing devices, such as cameras, include a lens, a shutter, and either a photosensitive film or an electronic image sensor. In addition, most modern cameras include a processor and/or other control electronics that function to control shutter speed, aperture, flash, focus, etc.

In operation, the shutter is opened briefly to expose the film or the electronic image sensor and thereby form an image. The duration of the shutter opening is very critical and the quality of the captured image depends on a proper exposure time based on lighting, movement of the subject, focus distance, etc. Accurate and reliable shutter actuation is therefore the most important operation in a still image capturing device and must be accurately controlled in order to produce a satisfactory image.

A first prior art shutter approach is a mechanical shutter. The mechanical shutter has been widely used for a number of years and is generally in the form of an iris-type shutter. However, the prior art mechanical shutter has many drawbacks including weight, large size, susceptibility to dirt and wear, and the difficulty of precisely controlling shutter exposure times over a wide range of conditions. In addition, the typical iris-type mechanical shutter exposes the center of the image for a longer time than the edges of the image.

In some prior art cameras, the mechanical shutter is electronically activated by a motor or other electrical actuator. This may produce more accurate shutter control, but consumes a lot of electrical energy and still exposes the image unevenly.

One approach to eliminating these drawbacks has been to use an electronic shutter, such as a liquid crystal display (LCD) element. This gives a prior art camera an advantageous precise electronic control over exposure times. In addition, the LCD element may be switched to a light transparent mode over all regions of the LCD element at once, unlike a mechanical iris shutter. This produces an even exposure time over the entire image area. In addition, an electronic LCD shutter can be set to varying levels of opacity in order to reduce the brightness of very bright scenes.

However, the prior art electronic LCD shutter has several drawbacks. Because a LCD device polarizes the light that passes through it, prior art LCD shutters capture an image using polarized light. This may produce light irregularities if the light source used to capture the image is polarized, since only light polarized in a single plane passes through the shutter. In addition, the dual polarizing films used in prior art LCD shutters significantly reduce the amount of light that reaches the film or electronic imaging element.

Therefore, there remains a need in the art for improvements in still image capturing devices.

SUMMARY OF THE INVENTION

An electronic shutter apparatus for a still image capturing device is provided according to one embodiment of the invention. The apparatus comprises a beam splitter positioned in an incoming light beam path and splitting the incoming light beam into a first light beam and a second light beam. The apparatus further comprises first and second polarizing shutters respectively positioned in paths of the first and second light beams and capable of being electrically activated to transmit light and to respectively form first and second polarized light beams. A polarization orientation of light from the second polarizing shutter is in non-alignment with a polarization orientation of light from the first polarizing shutter. The apparatus further comprises a beam combiner receiving and combining the first and second polarized light beams to form a substantially non-polarized resultant light beam. The resultant light beam is focused onto an image sensor.

According to another embodiment of the invention, an electronic shutter apparatus for a still image capturing device is provided which comprises a beam splitter means for splitting the incoming light beam path into a first light beam and second light beam. The apparatus further comprises first and second polarizing shutters respectively positioned in paths of the first and second light beams and capable of being electrically activated to transmit light and to respectively form first and second polarized light beams. A polarization orientation of light from the second polarizing shutter is in non-alignment with a polarization orientation of light from the first polarizing shutter. The apparatus further comprises a beam combiner means for combining the first and second polarized light beams to form a substantially non-polarized resultant light beam. The apparatus further comprises two or more reflecting means for reflecting and directing the first and second light beams into the first and second polarizing shutters and for reflecting and directing the first and second polarized light beams into the beam combiner means. The apparatus further comprises a processor controlling the first and second polarizing shutters to selectively admit light to the image sensor of the still image capturing device.

According to yet another embodiment of the invention, a light shuttering method for a still image capturing device is provided, which comprises the steps of splitting an incoming light beam into a first light beam and a second light beam, providing a first polarizing shutter in the first light beam to produce a first polarized light beam, and providing a second polarizing shutter in the second light beam to produce a second polarized light beam. A polarization orientation of light from the second polarizing shutter is in non-alignment with a polarization orientation of light from the first polarizing shutter. The method further comprises the step of combining the first polarized light beam and the second polarized light beam to form a substantially non-polarized resultant light beam and providing the resultant light beam to an image sensor of the still image capturing device.

DETAILED DESCRIPTION

Figure 1:
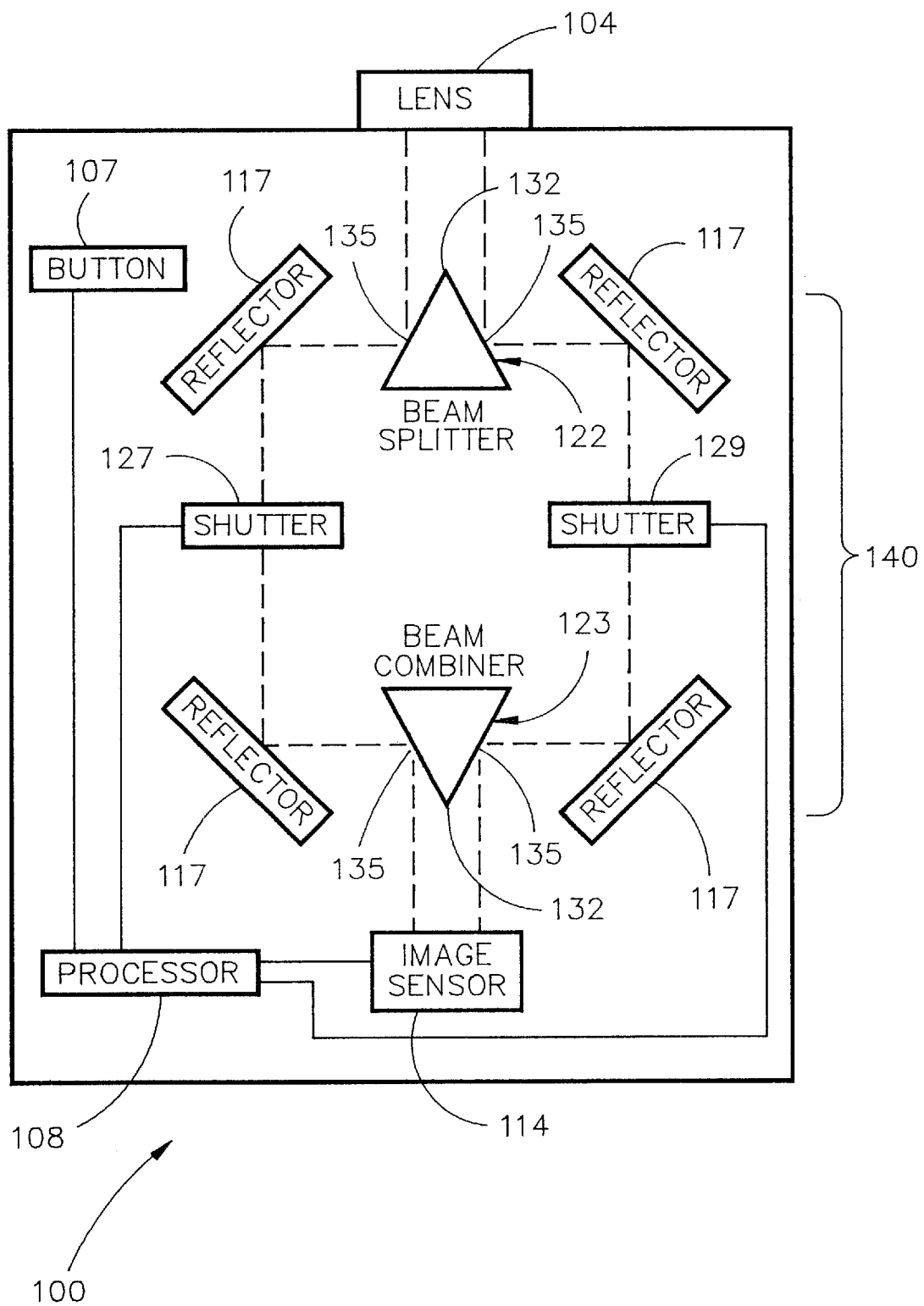
FIG. 1 is a block diagram of a still image capturing device according to a first embodiment of the invention.

FIG. 1 is a block diagram of a still image capturing device 100 according to a first embodiment of the invention. The still image capturing device 100 includes a lens or lens apparatus 104, a shutter button 107, a processor 108, and an image sensor 114. The still image capturing device 100 further includes an electronic shutter mechanism 140. The electronic shutter mechanism 140 includes a beam splitter 122, a beam combiner 123, a first polarizing shutter 127, a second polarizing shutter 129, and two or more reflectors 117.

The beam splitter 122 may be any type of device capable of splitting the incoming light beam into first and second light beams. For example, the beam splitter 122 may be a triangular or wedge-shaped mirror apparatus, may be a triangular or wedge-shaped prism apparatus, or may be some form of polarizing beam splitter (discussed below in conjunction with FIG. 2).

The beam combiner 123 is capable of combining two light beams. The beam combiner 123, like the beam splitter 122, may be a triangular or wedge-shaped mirror apparatus, may be a triangular or wedge-shaped prism apparatus, or may be some form of polarizing beam splitter.

In the embodiment shown, the beam splitter 122 and the beam combiner 123 comprise wedge-shaped mirror elements including an apex 132 and two angled side faces 135. The beam splitter 122 splits a light incident upon the apex 132 into first and second light beams at an angle of approximately ninety degrees from the incoming light beam. Likewise, the beam combiner 123 combines first and second polarized light beams incident upon the two angled side faces 135 (from the first and second polarizing shutters 127 and 129) into a resultant light beam emitted along the apex 132.

The first polarizing shutter 127 and the second polarizing shutter 129 are preferably LCD (liquid crystal display) elements comprising an incoming polarizing film (not shown), a LCD panel, and an outgoing polarizing film (not shown) that has a polarization orientation that is perpendicular to the polarization orientation of the incoming polarizing film if the LCD panel is normally dark (and parallel if normally light). A LCD element is capable of being electrically switched between a light transmissive state and a light opaque state. Therefore, a LCD element may form an electronic shutter. However, a single LCD element as a shutter has a drawback. A LCD element rotates and polarizes the light as it passes through the LCD. This is true of all LCDs, including nematic, super nematic, and super-twisted nematic LCDs. Therefore, according to the invention, two LCD elements may be used in order to avoid single plane polarization of the light employed in a captured image.

It should be noted that a polarization pattern of the first polarizing shutter 127 must be in non-alignment with a polarization pattern of the second polarizing shutter 129. Preferably, the polarization pattern of the first polarizing shutter 127 is substantially perpendicular to the polarization pattern of the second polarizing shutter 129. By using two polarizing shutters to form two differently polarized light beams that are combined, the resultant light beam produced at the image sensor 114 is substantially non-polarized. Therefore, the nature of the light source used to capture images is not important, and the light level received in the image sensor 114 is not substantially attenuated or reduced non-uniformly by the first and second polarizing shutters 127 and 129.

The two or more reflectors 117 may be any type of light reflective devices, including mirrors, lenses, prisms, etc. The reflectors 117 may be non-polarizing, but alternatively may include polarizing properties and thus enable removal of one of the polarizing films of the LCD elements. If a reflector 117 is polarizing, then the polarization orientation must be substantially aligned with a polarization orientation of a respective light beam.

In this embodiment, a first pair of reflectors 117 are positioned to direct the first light beam and the second light beam into the first polarizing shutter 127 and the second polarizing shutter 127. In addition, a second pair of reflectors 117 are positioned to direct the first polarized light beam from the first polarizing shutter 127 and the second polarized light beam from the second polarizing shutter 129 into the beam combiner 123. The second pair of reflectors 117 may be polarizing, with the above advantages of being able to remove the polarizers from the outgoing sides of the shutters 127 and 129.

The processor 108 may be any type of general purpose processor and may operate to control operation of the still image capturing device 100. The processor 108 controls the first polarizing light shutter 127 and the second polarizing light shutter 129 in order to capture images. In addition, if the image sensor 114 is an electronic (solid state) image sensor, the processor may control the storage of digital images in some form of memory (not shown).

The image sensor 114 may be any type of image capturing device, including conventional film or an electronic image sensor, such as a CCD sensor array or CMOS sensor array, for example.

In operation, the electronic shutter mechanism 140 is controlled by the processor 108 in response to a press of the shutter button 107 in order to capture an image. An incoming light beam enters the still image capturing device 100 through the lens 104. The lens 104 is configured to focus the light beam onto the image sensor 114 and thus the focal length of the lens 104 takes into account the entire path of the beam from the lens 104 to the image capturing surface of the image sensor 114. The input light beam impinges upon the beam splitter 122, which splits the incoming light beam into a first light beam and a second light beam. The first polarizing light shutter 127 is positioned in the first light beam, as directed by a reflector 117. The second polarizing shutter 129 is positioned in the second light beam, as directed by a reflector 117. When activated by the processor 108, the first polarizing shutter 127 and the second polarizing shutter 129 simultaneously allow the first and second light beams to pass through, i.e., they go to a light transmissive state. They are light transmissive for a predetermined exposure period, and are controlled to become light opaque at the end of the image capture. When the first and second light beams are allowed to pass through the first polarizing shutter 127 and the second polarizing shutter 129, they emerge as first and second polarized light beams and are directed into the beam combiner 123, which combines them into a substantially non-polarized resultant light beam that impinges on the image sensor 114.

Figure 2:
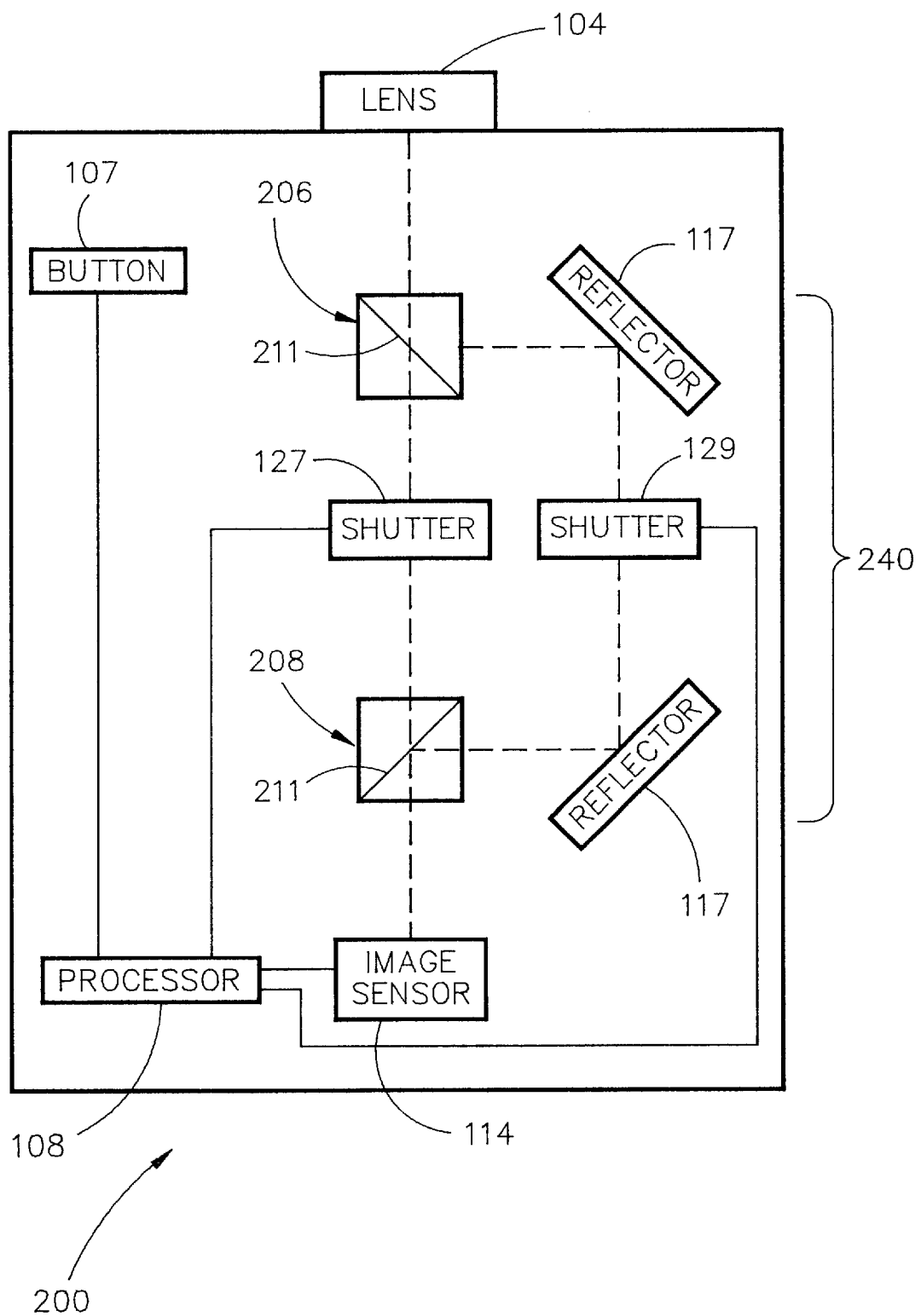
FIG. 2 is a block diagram of a still image capturing device according to a second embodiment of the invention.

FIG. 2 is a block diagram of a still image capturing device 200 according to a second embodiment of the invention. In the second embodiment 200, similar elements have the same reference numerals as in the first embodiment. However, the second embodiment 200 employs a different type of beam splitting technique, as embodied in a second electronic shutter mechanism 240. As before, the second electronic shutter mechanism 240 employs a first polarizing shutter 127 and a second polarizing shutter 129 and functions using two light beams. However, in this embodiment, the electronic shutter mechanism 240 employs a polarizing beam splitter 206 and a polarizing beam combiner 208. As a result, only two reflector devices 117 are needed and the polarizing films can be removed from the LCD elements.

The beam splitter 206 includes an angled, half-silvered, polarizing surface 211 that allows light of one polarization to pass through as a pre-polarized first light beam. The surface 211 reflects the light of a second, perpendicular polarization. The reflected light comprises a pre-polarized second light beam. The pre-polarized first light beam continues in the original direction and the pre-polarized second light beam is reflected out at a 90 degree angle to the incoming light beam. By employing a polarizing beam splitter, the second electronic shutter mechanism 240 advantageously eliminates the need for the polarizing film on the incoming side of the LCD element.

Likewise, the beam combiner 208 includes an angled, half-silvered polarizing surface 211 that allows light of one polarization to pass through. However, the beam splitter 206 is oriented so that it recombines the first and second polarized light beams into a substantially non-polarized resultant light beam. Similarly, the polarizing beam combiner 208 advantageously eliminates the need for the polarizing film on the outgoing side of the LCD element.

The second electronic shutter mechanism 240 therefore performs the same function as the first embodiment 140, but with only two reflector devices 117. It should be understood that in this embodiment, the transmissive polarization orientations of the first and second polarizing shutters 127 and 129 must be oriented to match the polarization orientations of the beam splitter 206. Likewise, the polarization orientations of the beam combiner 208 must match the transmissive polarization orientations of the first and second polarizing shutters 127 and 129 (i.e., the polarization orientations of all components in the first light path are substantially perpendicular to the polarization orientations of all components in the second light path). By pre-polarizing the first and second light beams using a polarizing beam splitter 206, the first and second light beams may experience less light loss when passing through the first and second polarizing shutters 127 and 129 than if polarization was done in a separate step using polarizing films.

Alternatively, the second electronic shutter mechanism 240 may be constructed wherein only one of the beam splitter 206 and the beam combiner 208 is polarizing in order to eliminate the incoming or outgoing polarizing films from the LCD elements. If the beam splitter 206 is polarizing, then the incoming polarizing films of the LCD elements may be eliminated. If the beam combiner 208 is polarizing, then the outgoing polarizing films of the LCD elements may be eliminated. Therefore, the second electronic shutter mechanism 240 may be constructed with a polarizing beam splitter 206, a polarizing beam combiner 208, or both.

Figure 3:
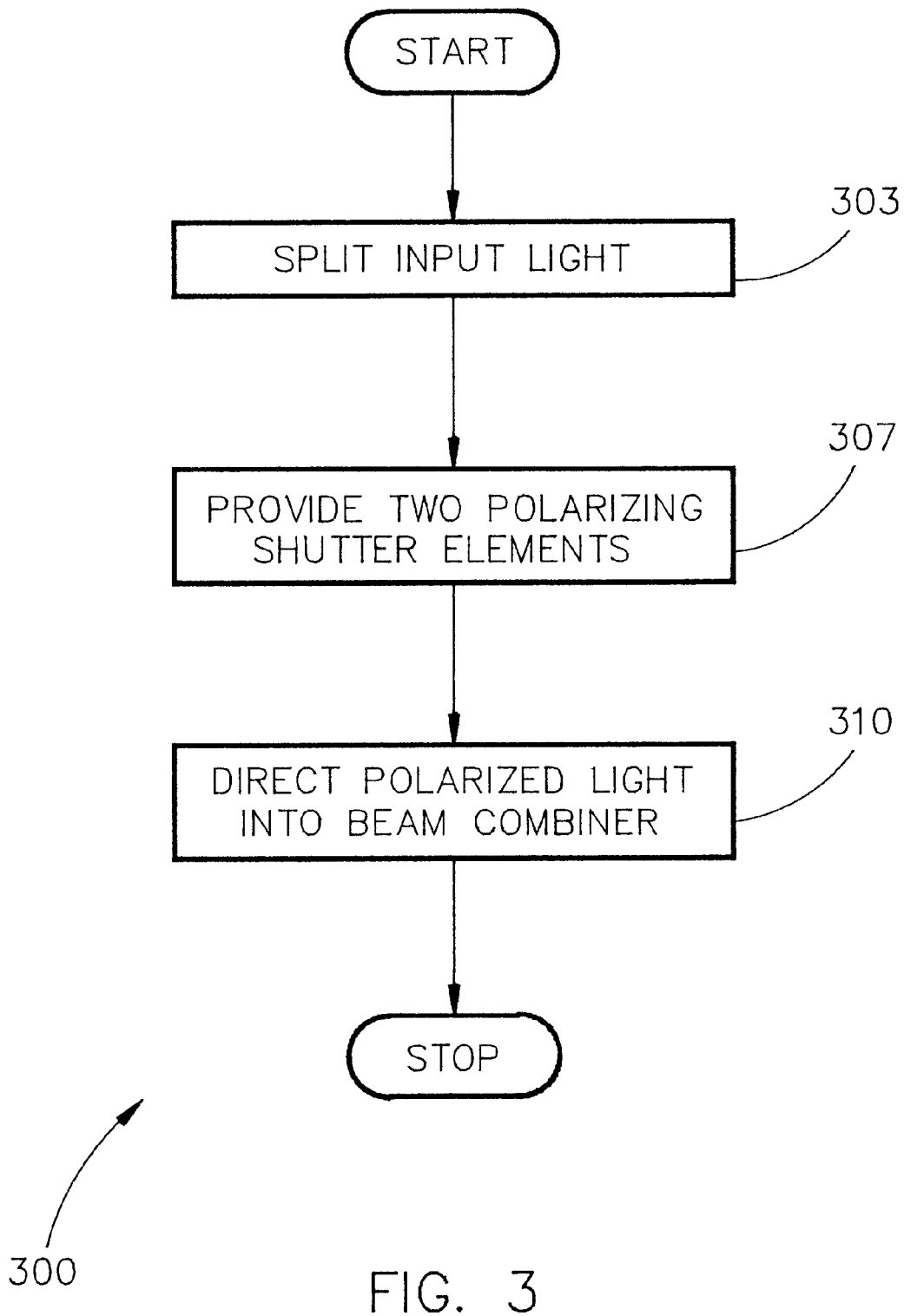
FIG. 3 is a flowchart of a light shuttering method embodiment for a still image capturing device according to the invention.

FIG. 3 is a flow chart of a light shuttering method embodiment for a still image capturing device according to the invention. In step 303, an incoming light beam is split into two light beams to form a first light beam and a second light beam. The splitting may be performed by any type of beam splitting device, including mirrored elements, optical devices, polarizing optical devices, etc.

In step 307, two polarizing shutters are provided, with the first polarizing shutter being positioned in the first light beam and the second polarizing shutter being positioned in the second light beam. The polarization orientations of the two polarizing shutters must be in non-alignment. Preferably, the polarization orientations of the two polarizing shutters are perpendicular, and the two polarizing shutters therefore produce polarized light beams of perpendicular polarization orientations.

In step 310, the two polarized light beams are combined to form a substantially non-polarized resultant light beam. The resultant light beam is provided to an image sensor of the still image capturing device.

The various embodiments of the apparatus and method according to the invention may be applied to digital and analog still cameras that include a processor or circuitry to control the shutters. The invention differs from the prior art in that the image capture does not capture polarized light, and effectively negates the polarization effect of a LCD element or light polarizing shutter element.

The invention provides several benefits. The invention provides precise electronic control over exposure times and therefore an increased accuracy and flexibility of exposure times. In addition, the invention allows uniform exposure wherein the center of the image is exposed for the same time period as the edges of image. The invention also provides an improved ruggedness, a lower power consumption, and a greatly increased shuttering flexibility. All of these benefits are achieved without capturing images using a substantially polarized light.

We claim:

1. An electronic shutter apparatus for a still image capturing device, comprising:
   a beam splitter positioned in an incoming light beam and splitting said incoming light beam into a first light beam and a second light beam;
   first and second polarizing shutters respectively positioned in paths of said first and second light beams and capable of being electrically activated to transmit light and to respectively form first and second polarized light beams, with a polarization orientation of light from said second polarizing shutter being in non-alignment with a polarization orientation of light from said first polarizing shutter;
   a beam combiner receiving and combining said first and second polarized light beams to form a substantially non-polarized resultant light beam, said resultant light beam being focused onto an image sensor.

2. The apparatus of claim 1, further comprising:
   two or more reflectors positioned to direct said first and second light beams into
   said first and second polarizing shutters and to direct said first and second polarized light beams into said beam combiner; and
   a processor controlling said first and second polarizing shutters to selectively admit light to an image sensor of said still image capturing device.

3. The apparatus of claim 1, wherein said first and second polarizing shutters comprise LCD elements.

4. The apparatus of claim 1, wherein said polarization orientation of light from said second polarizing shutter is substantially perpendicular to light from said polarization orientation of said first polarizing shutter.

5. The apparatus of claim 1, wherein at least one of said beam splitter and beam combiner are polarizing devices.

6. The apparatus of claim 1, with said beam splitter and said beam combiner comprising wedge-shaped mirror elements including an apex and two angled side faces, and wherein said beam splitter splits a light incident upon said apex into said first and second light beams at an angle of approximately ninety degrees from said incoming light beam, and said beam combiner combines said first and second polarized light beams incident upon said two angled side faces into said resultant light beam emitted along said apex, and with said apparatus further comprising:

a first pair of reflectors positioned in said first and second light beams and directing said first and second light beams into said first and second polarizing shutters; and a second pair of reflectors positioned in said first and second polarized light beams and directing said first and second polarized light beams into said beam combiner.

7. The apparatus of claim 1, with said beam splitter and said beam combiner comprising polarizing devices including an angled, polarizing surface, with said beam splitter receiving said incoming light beam upon said angled, polarizing surface and substantially passing light of a first polarization as a pre-polarized first light beam and substantially reflecting a light of a second polarization as a pre-polarized second light beam at an angle of approximately ninety degrees from said incoming light beam, and said beam combiner substantially passing said first polarized light beam from said first polarizing shutter and substantially reflecting said second polarized light beam from said second polarizing shutter parallel to said first polarized light beam to form said resultant light beam, and with said apparatus further comprising:

a first reflector positioned in said pre-polarized second light beam, with said first reflector being positioned to direct said pre-polarized second light beam into said second polarizing shutter; and a second reflector positioned in said second polarized light beam, with said second reflector being positioned to direct said second polarized light beam into said beam combiner.

8. An electronic shutter apparatus for a still image capturing device, comprising:

a beam splitter means for splitting said incoming light beam path into a first light beam and a second light beam;

first and second polarizing shutters respectively positioned in paths of said first and second light beams and capable of being electrically activated to transmit light and to respectively form first and second polarized light beams, with a polarization orientation of light from said second polarizing shutter being in non-alignment with a polarization orientation of light from said first polarizing shutter;

a beam combiner means for combining said first and second polarizing light beams to form a substantially non-polarized resultant light beam, said resultant light beam being focused onto an image sensor;

two or more reflecting means for reflecting and directing said first and second light beams into said first and second polarizing shutters and for reflecting and directing said first and second polarized light beams into said beam combiner means; and a processor controlling said first and second polarizing shutters to selectively admit light to said image sensor of said still image capturing device.

9. The apparatus of claim 8, wherein said first and second polarizing shutters comprise LCD elements.

10. The apparatus of claim 8, wherein said polarization orientation of light from said second polarizing shutter is substantially perpendicular to light from said polarization orientation of said first polarizing shutter.

11. The apparatus of claim 8, wherein at least one of said beam splitter means and said beam combiner means are polarizing devices.

12. The apparatus of claim 8, wherein said beam splitter means splits said incoming light into said first and second light beams at an angle of approximately ninety degrees from said incoming light beam, and said beam combiner means combines said first and second polarized light beams into said resultant light beam, and with said two or more reflecting means comprising:

a first pair of reflecting means positioned in said first and second light beams and directing said first and second light beams into said first and second polarizing shutters; and a second pair of reflecting means positioned in said first and second polarized light beams and directing said first and second polarized light beams into said beam combiner means.

13. The apparatus of claim 8, with said beam splitter means and said beam combiner means comprising polarizing devices, with said beam splitter means receiving said incoming light beam and substantially passing light of a first polarization as a pre-polarized first light beam and substantially reflecting a light of a second polarization as a pre-polarized second light beam at an angle of approximately ninety degrees from said incoming light beam, and said beam combiner means substantially passing said first polarized light beam from said first polarizing shutter and substantially reflecting said second polarized beam from said second polarizing shutter parallel to said first polarized light beam to form said resultant light beam, and with said two or more reflecting means comprising:

a first reflecting means positioned in said pre-polarized second light beam, with said first reflecting means being positioned to direct said second light beam into said second polarizing shutter; and a second reflecting means positioned in said second polarized light beam, with said second reflecting means being positioned to direct said second polarized light beam into said beam combiner means.

14. A light shuttering method for a still image capturing device, comprising the steps of:

splitting an incoming light beam into a first light beam and a second light beam;

providing a first polarizing shutter in said first light beam to produce a first polarized light beam;

providing a second polarizing shutter in said second light beam to produce a second polarized light beam, with a polarization orientation of light from said second polarizing shutter being in non-alignment with a polarization orientation of light from said first polarizing shutter;

combining said first polarized light beam and said second polarized light beam to form a substantially non-polarized resultant light beam; and providing said resultant light beam to an image sensor of said still image capturing device.

15. The method of claim 14, wherein said first and second polarizing shutters comprise LCD elements.

16. The method of claim 14, wherein said polarization orientation of light from said second polarizing shutter is substantially perpendicular to light from said polarization orientation of said first polarizing shutter.

17. The method of claim 14, wherein the splitting step splits said incoming light beam into a pre-polarized first light beam and a pre-polarized second light beam having a polarization orientation substantially perpendicular to a polarization orientation of said pre-polarized first light beam, and wherein said polarization orientation of light from said second polarizing shutter is substantially perpendicular to said polarization orientation of light from said first polarizing shutter and furthermore is substantially aligned with said polarization orientation of said pre-polarized second light beam.

18. The method of claim 14, further comprising the step of providing a plurality of reflectors positioned to direct said first and second light beams and to direct said first and second polarized light beams.

19. The method of claim 14, wherein the splitting and combining steps are performed by a beam splitter and a beam combiner comprising wedge-shaped mirror elements including an apex and two angled side faces, and wherein said beam splitter splits a light incident upon said apex into said first and second light beams at an angle of approximately ninety degrees from said incoming light beam, and said beam combiner combines said first and second polarized light beams incident upon said two angled side faces into said resultant light beam emitted along said apex.

20. The method of claim 14, wherein the splitting and combining steps are performed by a beam splitter and a beam combiner comprising polarizing devices including an angled, polarizing surface, with said beam splitter receiving said incoming light beam upon said angled, polarizing surface and substantially passing light of a first polarization as a pre-polarized first light beam and substantially reflecting a light of a second polarization as a pre-polarized second light beam at an angle of approximately ninety degrees from said incoming light beam, and said beam combiner substantially passing said first polarized light beam from said first polarizing shutter and substantially reflecting said second polarized beam from said second polarizing shutter parallel to said first polarized light beam to form said resultant light beam.

* * * * *